United States Patent
Remon Rodriguez (10) Patent No.: US 11,679,659 B2
(45) Date of Patent: Jun. 20, 2023

(54) ENERGY STORAGE SYSTEM FOR VEHICLES

(71) Applicant: Daniel Remon Rodriguez, Asturias (ES)

(72) Inventor: Daniel Remon Rodriguez, Asturias (ES)

(*) Notice: Subject to any disclaimer, the term of this patent is extended or adjusted under 35 U.S.C. 154(b) by 369 days.

(21) Appl. No.: 17/050,249

(22) PCT Filed: May 27, 2019

(86) PCT No.: PCT/ES2019/070352
§ 371 (c)(1),
(2) Date: Oct. 23, 2020

(87) PCT Pub. No.: WO2019/238985
PCT Pub. Date: Dec. 19, 2019

(65) Prior Publication Data
US 2021/0078399 A1    Mar. 18, 2021

(30) Foreign Application Priority Data

Jun. 14, 2018 (ES) .................. ES201830583

(51) Int. Cl.
*B60K 1/04* (2019.01)
*H01M 10/613* (2014.01)
(Continued)

(52) U.S. Cl.
CPC ............. *B60K 1/04* (2013.01); *B60L 50/64* (2019.02); *B60L 53/20* (2019.02); *B60Q 9/00* (2013.01);
(Continued)

(58) Field of Classification Search
CPC ......... H01M 2220/20; H01M 2200/00; H01M 50/20; H01M 10/653; H01M 10/647;
(Continued)

(56) References Cited

U.S. PATENT DOCUMENTS

| 1,993,893 A | 3/1935 | Page, Jr. |
| 5,760,569 A | 6/1998 | Chase, Jr. |

(Continued)

FOREIGN PATENT DOCUMENTS

| EP | 2537721 A2 | 12/2012 |
| FR | 2971986 A1 | 8/2012 |

(Continued)

OTHER PUBLICATIONS

International Search Report and Written Opinion for Corresponding international Application No. PCT/ES2019/070352 (9 Pages) (Sep. 25, 2019).

*Primary Examiner* — John D Walters
*Assistant Examiner* — James J Triggs
(74) *Attorney, Agent, or Firm* — Lucas & Mercanti, LLP (57) ABSTRACT

An energy storage system for vehicles is provided which is formed by a battery and a compartment for its accommodation which allows the insertion and removal of batteries and their connection to the electrical system of the vehicle with ease, quickly and at a low cost, both manually and based on auxiliary tools with different degrees of automation; the battery includes electrical connection elements and communication connection elements and is inserted in or removed from the compartment with a horizontal movement. The compartment includes electrical connection elements and communication connection elements complementary to those of the battery and allows cooling the battery; in this way, an electric vehicle can incorporate batteries as needed, adjusting its cost to its real use and reducing the waiting times due to charging its energy storage.

21 Claims, 2 Drawing Sheets

(51) Int. Cl.

| | |
|---|---|
| *H01M 10/625* | (2014.01) |
| *H01M 10/647* | (2014.01) |
| *H01M 10/653* | (2014.01) |
| *B60L 53/20* | (2019.01) |
| *B60L 50/64* | (2019.01) |
| *B60Q 9/00* | (2006.01) |
| *H01M 10/48* | (2006.01) |
| *H01M 50/249* | (2021.01) |
| *H01M 50/209* | (2021.01) |
| *H01M 50/24* | (2021.01) |
| *B60L 53/80* | (2019.01) |
| *B60K 1/00* | (2006.01) |

(52) U.S. Cl.
CPC ....... *H01M 10/488* (2013.01); *H01M 10/613* (2015.04); *H01M 10/625* (2015.04); *H01M 10/647* (2015.04); *H01M 10/653* (2015.04); *H01M 50/209* (2021.01); *H01M 50/24* (2021.01); *H01M 50/249* (2021.01); *B60K 2001/005* (2013.01); *B60K 2001/0494* (2013.01); *B60L 53/80* (2019.02); *H01M 2200/00* (2013.01); *H01M 2220/20* (2013.01)

(58) Field of Classification Search
CPC ............. H01M 10/625; H01M 10/613; H01M 10/488; B60L 53/80; B60L 53/20; B60L 50/64; B60K 2001/005; B60K 1/04; B60Q 9/00
See application file for complete search history.

(56) References Cited

U.S. PATENT DOCUMENTS

| | | | |
|---|---|---|---|
| 7,913,788 B1* | 3/2011 | Bryer | B60K 1/04 |
| | | | 180/69.1 |
| 8,051,934 B2* | 11/2011 | Kiya | H01M 50/20 |
| | | | 180/274 |
| 8,356,687 B2* | 1/2013 | Baumann | B60R 21/0134 |
| | | | 180/274 |
| 8,973,254 B2* | 3/2015 | Droste | B60L 50/66 |
| | | | 29/730 |
| 9,963,028 B1* | 5/2018 | Pachore | B60K 1/04 |
| 2005/0205316 A1* | 9/2005 | Yamafuji | B60R 16/04 |
| | | | 180/68.5 |
| 2010/0181129 A1 | 7/2010 | Hamidi | |
| 2012/0018237 A1* | 1/2012 | Kovach | B60L 50/64 |
| | | | 180/68.5 |
| 2012/0175177 A1* | 7/2012 | Lee | B60K 1/04 |
| | | | 180/68.5 |
| 2013/0183561 A1 | 7/2013 | Laitinen | |
| 2016/0001748 A1* | 1/2016 | Moskowitz | B60L 58/26 |
| | | | 701/22 |
| 2017/0113661 A1 | 4/2017 | Moskowitz | |
| 2017/0141368 A1 | 5/2017 | Ricci | |
| 2017/0334279 A1* | 11/2017 | Higuchi | B60L 50/66 |
| 2020/0254898 A1* | 8/2020 | Singhal | H01M 50/20 |

FOREIGN PATENT DOCUMENTS

| | | |
|---|---|---|
| WO | 0204275 A1 | 1/2002 |
| WO | 2015045981 A1 | 4/2015 |

\* cited by examiner

ENERGY STORAGE SYSTEM FOR VEHICLES

CROSS REFERENCE TO RELATED APPLICATION

This Application is a 371 of PCT/ES2019/070352 filed on May 27, 2019 which, in turn, claimed the priority of Spanish Patent Application No. P201830583 filed on Jun. 14, 2018, both applications are incorporated herein by reference.

TECHNICAL FIELD

The present invention relates to the field of transporting and more specifically the electrical equipment of vehicles or the propulsion of electric vehicles.

The main object of the present invention is an energy storage system for vehicles formed by a battery and a compartment for its accommodation that allows the insertion and removal of batteries of this type and their connection to the electrical system of the vehicle with ease, quickly and at a low cost, both manually and based on auxiliary tools having different degrees of automation.

BACKGROUND OF THE INVENTION

Currently commercially available electric cars have a high purchase price compared to their conventional internal combustion engine competitors. The main reason for this price difference is due to the cost of their energy storage system, in most cases based on batteries built of lithium or lithium-ion cells. To provide a greater range, manufacturers tend to increase the size of this energy storage system, although the resulting figures are still far from those corresponding to a fuel tank. This increase in size, besides a larger cost, also implies an increase in the vehicle weight and, thus, in its consumption.

Nevertheless, the range necessary to cover most of the usual rides is even less than the range of currently available electric cars. For this reason, there is a trade-off in the selection of either a vehicle intended for usual rides, at a lower price, or one that allows longer, less frequent rides, but at a higher price.

Taking this into account, a solution consists of employing an electric car equipped with a permanently-installed energy storage system, whose capacity allows covering usual rides with an additional range margin, and which can also be supplemented with energy storage systems which can be temporarily installed in the vehicle, in order to employ them in longer or unplanned rides, or in other situations that require an additional energy input.

In this regard, vehicles employing storage systems having some of these features have been proposed and even commercialized, but they have not been fully satisfactory. In some cases, the proposals have focused on a quick battery swap to restore the energy stored in the vehicle, this swap being based on additional infrastructure requiring a large investment and not taking advantage of the temporary nature that the use of these batteries may have. In other cases, the solutions proposed involve excessively complex battery removal or insertion processes, do not take into account essential structural constraints of the vehicles for which they are proposed, or have not been adequately put into practice. What follows is a list of documents available in the state of the art and relevant for the present invention.

The American patent U.S. Pat. No. 1,993,893 (George A. Page Jr.) describes a compartment for accommodating an electrical battery in the body of a vehicle. This compartment has a moving part that moves vertically where the battery is situated. At its lowest position, it allows removing or inserting a battery, whereas an upward movement allows closing the compartment and establishing the electrical connection of this battery with the electrical system of the vehicle. This patent, dating from 1935, does not take into account the characteristics of either the storage systems currently employed in the automotive industry and the possible needs for cooling or communication that they may have, or the characteristics of the compartment to be industrially applied to a car having a modern design.

The American patent application US 2017 113661 (Max Moskowitz) reviews different systems proposed for the use of removable batteries in electric vehicles and presents one in which batteries are inserted through the trunk zone and are automatically guided to contact points which are connected with a horizontal movement. In one possible variant, the use of a compartment having a tray with two moving pieces is indicated, one of them moves downwards from the central zone of the vehicle and the other one moves laterally outwards to allow loading the batteries. The description of this variant does not clarify how the battery connection to different systems of the car (electrical, communication, cooling) is established.

The American patent application US 2010 181129 (Vahid Hamidi) describes a system for accommodating removable batteries in a vehicle in which a small rack, where different batteries can be connected, moves vertically and batteries are connected with a horizontal movement, establishing connection through this horizontal movement and having contacts on two opposite faces. According to the description, the batteries are underneath the vehicle, constraining the swapping operation to the use of a complex tool installed in the floor, and even the use of several adjacent racks which would interfere when performing a simultaneous battery swap is presented.

The American patent application US 2013 183561 (Ernest W. Laitinen) is also found in the state of the art, said patent application describes removable batteries that are inserted horizontally and have contacts on a side face, as well as a handle. These batteries may be stacked and are inserted in a tight casing over which they slide. No vertical movement is considered for the compartment, which impedes its use in a car due to the constrained dimensions and the presence of bars of the resistant frame of the vehicle. No cooling system external to the batteries is presented either.

Other relevant patents are WO 2015 045981 (Koichi Tozaki), where batteries which are horizontally inserted in a bus are shown, said batteries being connected with that same horizontal movement, and US 2017 141368 A1 (Christopher Ricci), where batteries which are stacked in a frame and meant to be connected with a horizontal movement are shown.

DESCRIPTION OF THE INVENTION

In order to provide electrical energy storage systems that can be installed temporarily in a vehicle, the invention proposes an energy storage system for vehicles formed by a battery and a compartment for the accommodation thereof in the vehicle which allows its insertion and removal with a simple procedure that can be performed manually or with the help of tools having different degrees of automation.

This invention takes into account the needs of interaction of these batteries with the vehicle and other external systems such as those employed for their charging or storage, paying special attention to their electrical connection, communications and battery cooling. Moreover, the invention considers the geometrical features of currently used vehicles, especially cars, and makes the integration of the compartments for accommodating batteries into the structure of these vehicles possible without substantially modifying their external form, as well as the connection between battery and vehicle with simple movements and without needing mobile connection elements that require flexible cables adapting to different positions of these connection elements. To this end, the compartment for accommodating batteries considered in this invention has a simple structure, involving the movement of the minimal number of elements, and the process of inserting or removing a battery comes down to opening the compartment for battery placement, moving the battery horizontally to insert or remove it, and closing the compartment, without needing highly complex equipment to perform these operations.

The invention consists of two main components, a battery and a compartment for accommodating the battery in the vehicle which takes into account the physical features of the battery and allows its connection to different systems of the vehicle and its cooling when it is installed in the vehicle.

The battery has the approximate external form of a rectangular prism having a wide base and a low height. Inside, most of the space is occupied by basic storage units, with electrical junction elements, and has the possibility of integrating different auxiliary systems, among which a battery supervision and management system (taking into account aspects such as the voltage of different basic storage units or groups thereof, the temperature of relevant points, the total voltage and current or the state of charge of the battery), electrical protections or a power converter may be considered. Preferably, these additional systems are located next to one of the side faces of the theoretical prism. To set a reference, this face will be termed front face, its opposing face will be termed rear face, the remaining two side faces will be termed just side faces, and the wide bases will be termed lower base and upper base.

In general, the basic storage units inside the battery may be lithium-ion cells, electrochemical cells based on other substances, capacitors, inductors or other storage elements. Analogously, the elements that allow the management, protection and control of the battery may have different embodiments. This description does not limit the internal configuration of the battery.

The elements inside the battery which are subject to an electrical voltage permanently or temporarily during the use of the battery are electrically insulated, especially at the bottom and top part touching the bases. For this purpose, an electrically insulating, heat conductive material is employed. The battery casing is formed both by a lower base and an upper base made of a heat conductive material and by the other four faces made of an electrically and heat insulating material having good mechanical strength. In this way, the lower and upper bases of the battery are formed by elements made of a heat conductive material and the inside of the battery can be cooled through the bases. The other four faces fix the bases and may have outer shapes having edges rounded enough to avoid damage or injuries. Besides, both side faces may incorporate one or several handles and optionally one or several cylindrical-shaped bearings at their bottom to ease the movement of the battery.

The elements which allow the electrical and communication connection of the battery with the outside are situated inserted in the upper base, preferably in the zone where the elements to which they are connected inside the casing are found and next to the front face, being accessible from the outside through the upper base of the battery, and the battery has adequate wiring internally. To ease their connection to a charging system, the electrical connection elements may be compatible with widely-used specifications for direct current electric vehicle charging, such as, for instance, Combined Charging System (CCS) type 1 or type 2 connectors, in such a way that a battery can be charged being connected to a charging point for cars, or to equipment employing the same cables and connectors. Optionally, the battery may include auxiliary elements allowing it to be charged through single-phase or three-phase alternating current equipment. In the case of the communication connection elements, a similar design goal may be set, employing a usual communication system in vehicles, such as CAN, and connectors adapted to the requisites of this system.

Optionally, the battery may also include some type of state indicator that eases the management of its charging process and the identification of charged and exhausted batteries in the swapping process. This indicator may be based on one or several LED which may have different colours, on more sophisticated systems such as a screen having alphanumeric indicators, or on a combination thereof. These elements may be situated on the upper base or on one of the side faces, in such a way that they are easily visible from the outside.

Additionally, the batteries may include an element of asymmetry to ensure their correct orientation, preventing the movement to insert them in the compartment for their accommodation if their orientation is not correct. For instance, one option is that the upper edge of the rear face of the battery includes a rabbet, which may have a depth of 1 cm or less and different shapes, such as a chamfer or a square profile, whereas the spaces meant to accommodate the battery, such as the compartment for its accommodation in a vehicle or a storage shelf, may include a corresponding projection, in such a way that if anyone tries to insert the battery in any other orientation, the edge of the battery hits the projection and the battery cannot be inserted. Optionally, this projection may have a smaller depth than that of the rabbet in the battery to avoid friction when the battery is correctly inserted, and even a smaller width and rounded shapes, making it possible to reduce it to a protruding element in the zone nearest the face through which the battery is inserted, as long as it limits the advance of the battery when its orientation is not correct.

The other main component is a compartment that gets integrated into the vehicle and allows accommodating batteries of this invention. The compartment consists of an ensemble fixed to the vehicle structure and a drawer, connected to this fixed ensemble and having the possibility of moving in relation to it, in which a battery of this invention is situated. This compartment is designed to be installed underneath the vehicle, getting integrated into the vehicle profile when it is closed. The compartment is opened with a downward movement of the drawer defined by guiding elements and is closed with the reverse upward movement. This movement may also have a lateral component at the lowest points of the path, making more accessible the zone corresponding to one of the side faces of the drawer. The side face most exposed to the outside of the vehicle when the drawer is open will be termed outer side face throughout the rest of this document, whereas the face opposite to this will be termed inner side face and the remaining names of the compartment faces agree with those of the corresponding faces of a battery situated in the drawer.

Preferably, the drawer has walls on the front face, the rear face and the inner side face, the latter being its back and the surfaces of the outer side face and the upper face being clear, allowing the inside of the drawer to be accessed from these. The lower face has two levels, external and internal. The external level is lower, having a sheet of material that may be like the one employed in the bottom of the vehicle, and it is the level which continues the lower line of the vehicle when the compartment is closed, also being possible to ensure good insulation from the outside of the vehicle by means of an elastic trim on its perimeter. The internal level is above the external level, existing a small gap between both levels, and it is the level where the battery is situated inside the drawer. Preferably, this internal level is not fully materialised by a sheet of material, but it only has supports for the battery in the zones neighbouring the front face and the rear face, with the possibility of locating additional supports in intermediate zones. Each of these supports may be formed by a structural part which connects both levels and allows air to circulate between them, and an upper piece having a low friction coating, possibly made of a plastic material, which is easily replaceable in case of wear and which allows the battery to slide or roll over it. On the internal level of the lower face, in the zone of the outer side face, a small bump may be included to prevent an unwanted outward movement of the battery without constraining either its intentional insertion or removal. Optionally, the profile of this bump is lower in the central zone so that the battery only touches the bump on its ends. Also optionally, this bump may have one or several cylindrical-shaped bearings so that the lower base of the battery rolls over it.

The ensemble of the compartment fixed to the vehicle structure has walls on the front face, the rear face, the side faces and the upper face. When the compartment is closed accommodating a battery inside, there exists also a gap between the upper face of the compartment and the upper base of the battery. The gaps provided in the lower and upper parts allow the circulation of air for cooling or air-conditioning the compartment, keeping the lower and the upper bases of the battery clear and providing cooling to the battery through these bases. The air circulation towards and from the compartment may be done through cooling openings in the lower and/or the upper part of the front wall, the rear wall or the side walls of the ensemble fixed to the vehicle structure.

Moreover, the upper part may include some stops, preferably on the sides in a complementary position to that of the handles of the battery, which ensure that the battery does not move vertically nor laterally when the compartment is closed, the longitudinal movement being constrained by the walls of the drawer. The electrical connection elements and the communication connection elements of the compartment are also installed in the upper part of the ensemble fixed to the vehicle structure, pointing downwards in the corresponding position to the connection elements of the battery, with a shape complementary to that thereof, and possibly having a small tolerance or flexibility to compensate small misalignments of the battery position, in such a way that the connections are established with the upward movement corresponding to closing the compartment and remain while the compartment is closed.

Optionally, reflective elements, or elements made from certain material or with a certain topology, which allow detecting the position of the drawer with an external sensor are placed on the most external part of the drawer, in such a way that they may be employed to orient a tool or machine employed in the swapping operation to correctly insert or remove a battery.

Preferably, the fastening of the drawer is ensured with bolts that are inserted underneath the front and the rear faces when the compartment is closed. These bolts may have a triangular profile with a horizontal upper part, in such a way that they allow the movement of the drawer upwards but not downwards. The bolts are attached to the ensemble of the compartment fixed to the vehicle structure, being able to move through its walls through a fastener opening, and they use the gap between both levels of the lower face of the drawer to be situated between them and thus prevent the downward movement of the drawer. Preferably, a bolt is considered in the central zone of each of these two faces, but a different number of them may be installed.

The movement of the drawer may be limited with slides like those employed for the drawers in a piece of furniture and, optionally, the profile of these slides may describe a line that causes a movement with a lateral component at the lowest part of the path of the drawer. As a reference, it may be considered that two slides are attached to each of the front and the rear walls of the drawer, near their ends, each of the slides closed at least on its top and with a single corresponding bearing attached to the ensemble fixed to the vehicle structure at its lowest part. Nonetheless, other options may be considered, with bearing and slide on both parts, or employing another number of slides for each of the front and the rear walls of the drawer, even with a different number for each of the walls or considering their installation on the inner side wall of the drawer. In order to ease both the assembly of the compartment and maintenance operations, each slide may have some holes which allow fixing the bearing to one of the bodies through these holes once the slide has already been fixed to the other body, for instance, the bearing to the ensemble fixed to the vehicle structure and the slide to the drawer.

Several optional elements may be considered to ease the movement of opening and closing the drawer. The outer part of the lower face of the drawer may be made with an adequate shape to provide a grip zone to move the drawer manually. It is also possible to incorporate a damping element into the drawer to limit the speed with which it moves down. Likewise, it is possible to consider the presence of a drawer-lifting element which acts automatically, without needing to make the effort manually, and which can also act as a retention element during the downward movement of the drawer. A possible way to do this is by installing a strap or chain attached to the inner side wall of the drawer, or even anchored to the sheet of the external level of the lower face of the drawer, and said strap or chain being reeled out or in through a reel or pinion moved by an electrical motor. A variant of this solution is installing this system either on the front wall of the drawer, on its rear wall, or on both. An alternative solution may be that of considering some gear teeth in one of the bearing-slide sets, by replacing it with a rack and pinion set in which the pinion, attached to the ensemble fixed to the vehicle structure, is moved by an electrical motor. This type of systems may also have a brake by means of an appendix which either presses the strap against another surface, is inserted in one of the holes of the chain, or blocks the teeth of the pinion; this brake reduces the effort made by the motor, making it work only when the drawer moves and preventing it from withstanding any type of effort in other circumstances. Other mechanisms and actuation systems, such as a hydraulic circuit, may be considered.

Besides, from this description it is possible to consider a series of minor variations. Some of them affect the lower face of the drawer. The internal level of the lower face may have a continuous surface, which may be mostly flat to achieve a good support of the battery; in this case, the cooling may be kept on both battery bases or only on the upper one. The lower face may lack the sheet on its external level, thus the internal level forming the external line of the compartment or even the battery being left partially uncovered underneath. On the other hand, the outer side face of the drawer may have a longer dimension in the direction corresponding to the length of the vehicle, adapting the shape of the front and the rear walls of the drawer at their outer part by a curved line, in order to have a greater tolerance in the insertion of the battery and to allow its correct orientation when it is totally inserted. Moreover, the inner side face may lack the wall, thus making the inside of the drawer accessible also from this face, and optionally include a bump, in order to allow the insertion or removal of the battery through both side faces of the drawer and the right placement of the battery in the drawer. With respect to the fastening of the drawer, this may be carried out with a system similar to that of other compartments of the vehicle, with a piece in the drawer and a jaw latch embracing it in the ensemble fixed to the vehicle structure, it being possible that the jaw latch has a plane of symmetry parallel to the front and rear faces of the vehicle and allowing fastening the drawer with an upward movement. In turn, the movement of the drawer may be straight, whether strictly vertical or diagonal, the slides which define this movement being straight.

Double safety systems may also be considered in order to prevent the battery from moving out of the compartment in case of an accident. An option may be that of a plate which is attached to the drawer forming a wall on the outer side face of the drawer when the compartment is closed, this plate not being attached to the ensemble fixed to the vehicle structure, and this plate being fixed to this ensemble and detached from the drawer when the compartment is intentionally opened. With a drawer-lifting element having a brake, this brake may play the role of an additional safety element when the fastening bolts fail (for instance, due to a shock that deforms the drawer); additionally, in case of considering a strap or chain, it is possible to employ a plasticity link with the drawer which makes the strap or chain limit the movement of the battery preventing it from leaving the drawer if the compartment is opened, acting as a safety belt. Another option is installing bolts on the sides of the compartment which are situated underneath the handles of the battery when the compartment is closed, preventing the battery from moving downwards although the drawer breaks free.

The invention may be incorporated into a vehicle both originally during the manufacture thereof and during a later modification, in different configurations. Optionally, it is possible to consider four compartments installed underneath the passenger compartment, two on each side, with the electrical and communication connection elements in the same position on both sides or situated towards the front of the vehicle on one side and towards the rear on the other one.

In a configuration of this type, the batteries may be connected to the electrical system of the vehicle, optionally at the direct current side of the traction converter and the charger, in parallel with a permanently-installed energy storage system, and employing the adequate control elements to allow an adequate connection independently of the fact that the voltages of the groups of basic energy storage elements forming the different energy storage systems installed in the vehicle may be different, whether by means of switches that connect only one of these systems at every instant or by means of converters that allow their simultaneous use. The cables and cooling ducts may occupy part of the central longitudinal space of the vehicle, and they may even be situated slightly above with a small uplifting of the passenger compartment floor in this central zone, such as the one that is usual in combustion engine cars. Optionally, the vehicle may include elements to break the connection between the batteries and the vehicle even when the batteries are in the closed compartment with the electrical and communication connection elements correctly connected, keeping the remaining systems in operation. This may be done by means of either a switch for the connection circuit of each battery or a common one for all of them. This would allow performing a battery insertion or removal operation without electrical risk even when some systems of the vehicle are kept working, as long as the corresponding switch is open, condition that may be linked to the opening of the compartment.

On the other hand, it may be considered that some of the auxiliary elements of the battery, such as a possible converter or circuit breaking elements, are installed in the vehicle and not within the battery itself. Within this option, it may be considered that the elements installed in the vehicle correspond to one per battery or that there is a common one for more than one battery, and that they are located in the vicinity of the corresponding batteries or in any other point of the electrical system of the vehicle.

In a car considering the described storage system, the battery permanently installed in the vehicle may have a smaller size than the currently usual ones and may be located either over the battery compartments of this invention, underneath the rear seats, in the space between the battery compartments and the rear axle, over this axle, around the front axle, in the front of the vehicle, or even in the central zone among the battery compartments of this invention.

In any case, when the invention is used, the battery is inserted and removed making a horizontal movement, which reduces the necessary effort and allows a manual operation. In an auxiliary way, a tool may be employed, said tool having wheels to move the battery outside the vehicle or having the possibility of modifying its height in order to locate the battery in an adequate place for its storage or charging. In particular, an operation of swapping one battery for another is carried out as follows.

First, the compartment containing the battery is opened, setting the drawer free and letting it move to its lowest position. The battery is removed with a horizontal movement, sliding over the internal level of the lower face of the drawer and optionally over a surface situated outside to ease the operation, such as that of a tool employed later to move the battery. Once removed, this battery is moved to a transient storage place for the swapping process or a longer term storage place to store or charge it, and the battery replacing it is situated in the same position. The battery to be inserted is moved into the drawer with a horizontal movement, optionally sliding over the surface where it initially lies and over the internal level of the lower face of the drawer, until it reaches the back defined by the wall of the inner side face. Finally, the drawer moves up and its position is secured with the fastening elements. In case of performing only the removal or the insertion of a battery, analogous steps are followed, respectively leaving out the insertion of the second battery and the removal of the first one. Battery movements may be done either manually, with the help of tools that allow situating the battery on a horizontal plane and modifying the height at which they are, or by means of a machine that automates the swapping process. Similarly, the auxiliary operations related to batteries, such as their storage or their connection to charging equipment, may be done manually or automatically.

BRIEF DESCRIPTION OF THE DRAWINGS

To supplement the description being done and in order to contribute to a better understanding of the features of the invention, a set of drawings is attached as an integral part of said description where, with an illustrative and non-limiting purpose, the following has been represented.

PREFERRED EMBODIMENT OF THE INVENTION

In the preferred embodiment of the invention, the main components thereof that interact during its operation are a battery (1) and a compartment (2) where said battery (1) is accommodated.

Figure 1:
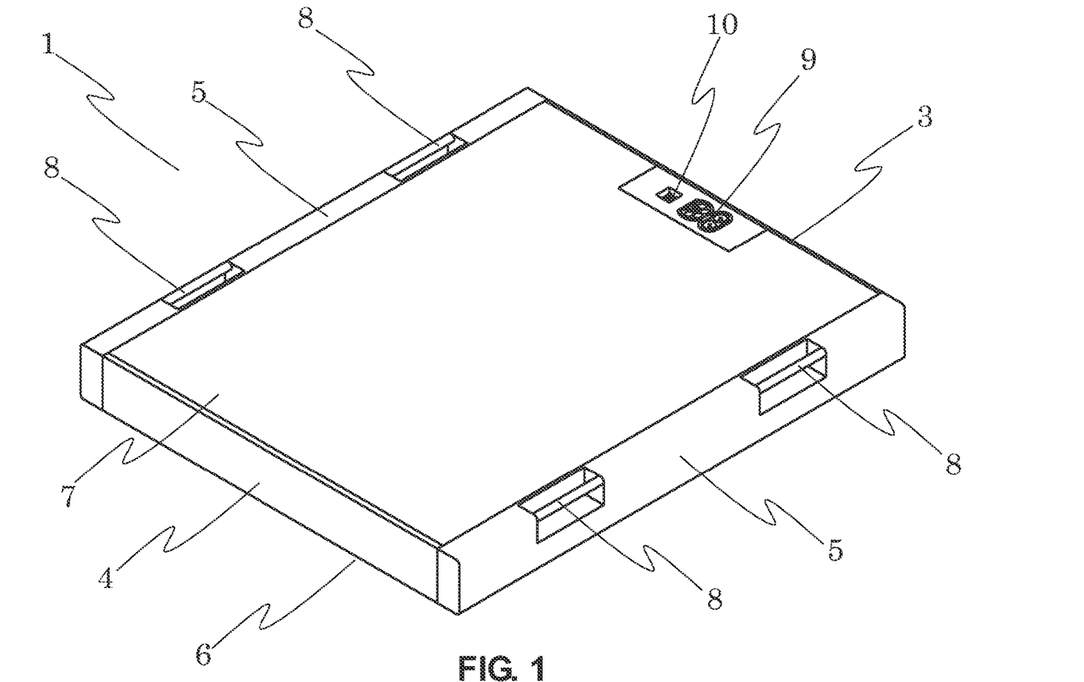
FIG. 1 illustrates the external appearance of the battery of the invention according to an example of preferred embodiment.

The battery (1) has approximately the shape of a rectangular prism having a wide base and a low height. In the terms in which this description is done, the bases delimited by edges whose size corresponds to the length and the width are defined as lower base (6) and upper base (7), the faces delimited by edges whose size corresponds to the length and the height are defined as side faces (5), and the faces delimited by edges whose size corresponds to the width and the height are defined as front face (3) and rear face (4). The distinction between lower base (6) and upper base (7) and between front face (3) and rear face (4) is defined in the following in relation to the position of some elements that compose the battery (1).

A plurality of basic energy storage units is found inside the battery (1) having electrical junction elements therebetween, and auxiliary systems situated next to the front face (3) of the battery (1). These auxiliary systems comprise a supervision and management system of the battery (1), electrical protections and a power converter. Besides these elements, the electrical connection elements (9) and communication connection elements (10) of the battery (1) are installed in this zone adjacent to the front face (3) and inserted in the upper base (7). In this way, the front face (3) and the upper base (7) are defined unequivocally, and the rear face (4) and the lower base (6) are defined as those respectively opposing them.

The elements inside the battery (1) which are subject to an electrical voltage, especially at the bottom and top in contact with the lower base (6) and the upper base (7), are electrically insulated by means of an electrically insulating but heat conductive material, such as Sil-Pad. The battery (1) is enclosed at its front face (3), its rear face (4) and its side faces (5) by a material having good mechanical strength and electrically and heat insulating, preferably of plastic origin, and at the lower base (6) and the upper base (7) by sheets of a heat conductive material, such as aluminium, in order to allow its cooling. Around the electrical connection elements (9) and communication connection elements (10) of the battery (1), the casing may be made of plastic, being correctly integrated into the sheet forming the upper base (7). In each of the side faces (5) of the casing, at their upper edge and getting integrated into the prismatic shape, two handles (8) are set to allow a person to move the battery (1) using both arms.

With this configuration of the battery (1), with approximate dimensions of 80 cm long by 70 cm wide and 10 cm high, and employing 18650 NMC lithium-ion cells, it is possible even to build a battery (1) having a capacity of approximately 14 kWh and a mass around 70 kg. This battery (1) may be manually moved a distance of the order of 1 m in a horizontal direction sliding or rolling over a surface, employing a relatively simple tool for vertical or longer movements.

The external appearance following this description can be seen in FIG. 1.

Figure 2:
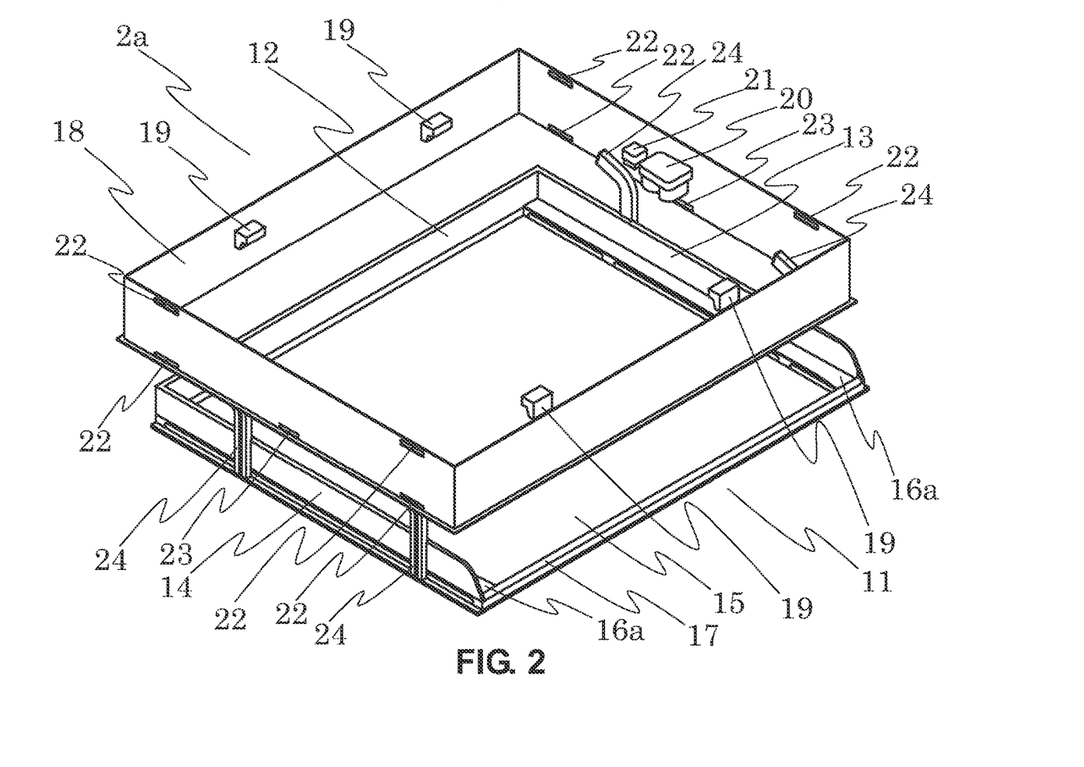
FIG. 2 illustrates the general appearance of the battery compartments of the invention according to an example of preferred embodiment, including the elements of the upper part fixed to the vehicle. The face limiting the compartment on its upper part has not been represented in order to make the inside visible.

The compartment (2) where the battery (1) is accommodated consists of an ensemble (18) fixed to the vehicle structure and a drawer (11) having an adequate shape to accommodate a battery (1) connected to said ensemble (18). The fixed ensemble (18) is installed underneath the vehicle, in such a way that the drawer (11) gets integrated into the lower external line of the vehicle when the compartment (2) is closed. The faces of the compartment (2), not all of them physically realised, are termed in the same way as the corresponding faces of the battery (1), one of the side faces being the face which is nearest the outer edge of the vehicle. This face nearest the outer edge is termed outer side face of the compartment (2), the opposite face being the inner side face. The compartment (2) is opened with a downward movement of the drawer (11) having a lateral movement toward the outside of the vehicle at the end of its path, said lateral movement allowing making the outer side face more accessible from outside the vehicle. The compartment (2) is closed with the reverse movement of the drawer (11), upwards.

The drawer (11) has walls (12), (13), (14) respectively at the inner side face, the front face and the rear face, respectively, the wall of the inner side face (12) being its back and the surfaces of the outer side face and the upper face being clear, thus allowing accessing the inside of the drawer (11) from these faces. The walls (12), (13), (14) of the inner side face, the front face and the rear face of the drawer (11) take up part of the height of the battery (1) and the walls (13), (14) of the front and the rear faces have a rabbet on the part nearest the outer side face, converging with the lower face. The lower face has two levels, external and internal. The external level is below, having a sheet (15) of material like the one employed in the bottom of the vehicle. This external level continues the lower line of the vehicle when the compartment (2) is closed, also ensuring a good insulation from the outside of the vehicle by means of an elastic trim on its perimeter. The internal level is above the external level, a small gap existing between both levels, and it is the level where the battery (1) is situated inside the drawer (11). This internal level is formed by some supports (16) for the battery (1) in the zones neighbouring the walls (13), (14) of the front and the rear faces. These supports (16) are formed by a structural part, which supports the weight of the battery (1), and an upper piece having a low friction coating, made of plastic, which is easily replaceable in case of wear and allows the battery (1) to slide over it. The structural part that connects these supports (16) with the sheet (15) of the external level is formed by a series of piers with free space among them through which the air can circulate. In the upper part of the internal level, in the zone of the outer side face, a small bump (17) is set ensuring the correct placement of the battery (1) in relation to its side faces (5) and prevents an unwanted outward movement of the battery (1) without constraining its intentional insertion or removal.

The ensemble (18) fixed to the vehicle structure has walls on the front face, the rear face, the side faces and the upper face and provides a gap between the upper wall and the upper base (7) of the battery (1) when the compartment (2) is closed accommodating a battery (1) inside. The gaps provided in the lower part and the upper part allow the circulation of air to cool or air-condition the compartment (2), which enters and leaves the compartment (2) through two cooling openings (22) on each of the front and the rear walls of the ensemble (18) fixed to the vehicle structure, in zones corresponding to the gaps in the lower part and the upper part of the compartment (2). In this way, the lower base (6) and the upper base (7) of the battery (1) are clear of obstructions and the air circulation provides cooling for the battery (1) through this lower base (6) and this upper base (7).

The upper part includes some stops (19) situated on the sides, in a complementary position to that of the handles (8) of the battery (1). The electrical connection elements (20) and communication connection elements (21) of the compartment (2) are also installed in the upper part of the ensemble (18) fixed to the structure of the vehicle, pointing downwards in a position corresponding to and having a shape corresponding to the electrical connection elements (9) and communication connection elements (10) of the battery (1), allowing the respective connections to be established by means of the upward movement of the drawer (11) that closes the compartment (2) when a battery (1) is situated in the drawer (11), and to be kept when the compartment (2) is closed. These connection elements (20), (21) of the compartment (2) are assembled in a not totally rigid way and provide a degree of freedom that allows a small tolerance in the position of the battery (1) in order to ensure a good connection.

The general appearance of the compartment (2), with the ensemble (18) fixed to the vehicle structure and the drawer (11) at its lowest position, is illustrated in FIG. 2.

When the compartment (2) is closed, the drawer (11) is fastened to the ensemble (18) fixed to the vehicle structure using two bolts that are inserted between both levels of the lower face of the drawer, one of the bolts under the front wall (13) and the other under the rear wall (14). These bolts have a triangular profile having a horizontal upper part, in such a way that they allow the movement of the drawer (11) upwards but not downwards. Each of these bolts is attached to the ensemble (18) fixed to the vehicle structure, moves through a fastener opening (23) on the corresponding wall of the ensemble (18) fixed to the structure of the vehicle and uses the gap between both levels of the lower face of the drawer (11) to be inserted and prevent the downward movement of the drawer (11).

The movement of the drawer (11) is constrained by some slides (24) that move over a bearing, with the kinematic constraints of those employed for the drawers in a piece of furniture, but having greater mechanical strength and describing a line causing a lateral component movement at the lowest part of the path of the drawer (11). Two slides (24) are fixed to each of the front and the rear walls (13), (14) of the drawer (11), near their ends, whereas the corresponding bearing for each of them is situated at the lowest part of the ensemble (18) fixed to the vehicle structure.

Figure 3:
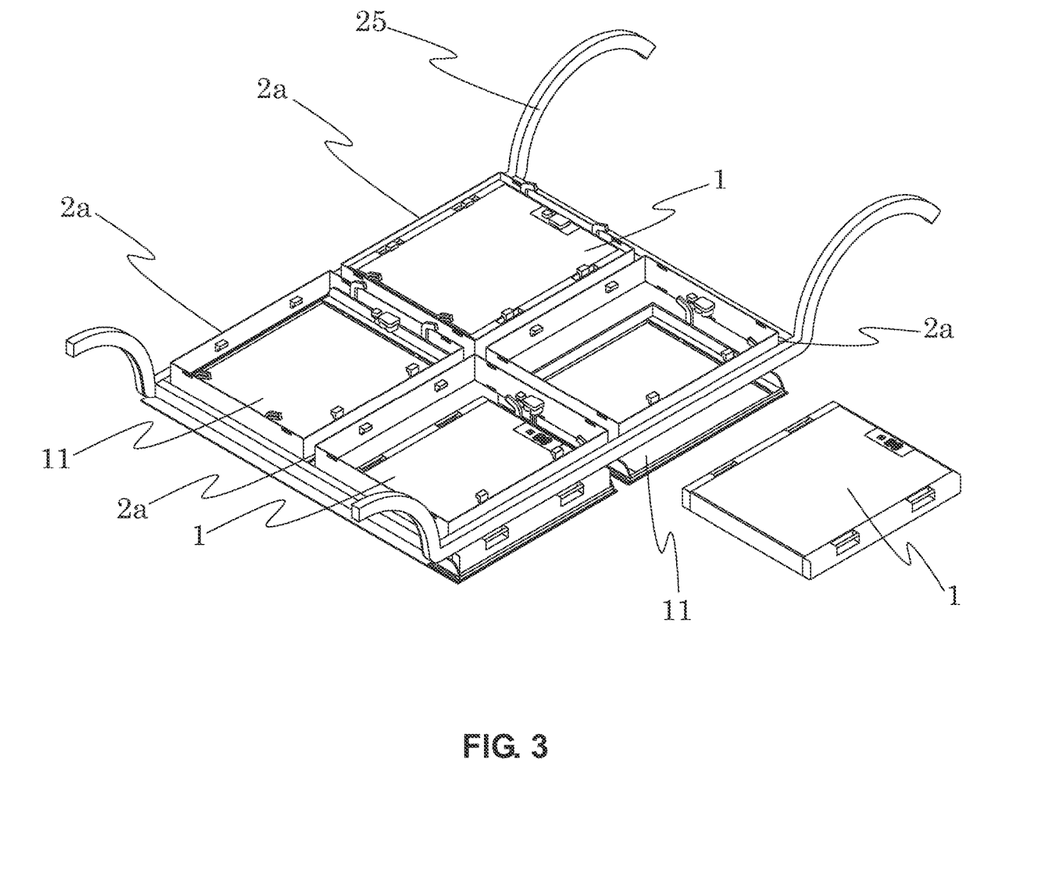
FIG. 3 illustrates a possible integration of the battery compartments according to an example of preferred embodiment of the invention together with the structure of a vehicle. The left side compartments are closed, one of them is empty and the other one contains a battery, and the right side compartments are open, the rear one has a battery in the drawer and the front one is empty, with a battery outside, in the right orientation to be inserted in this compartment. In the upper part of the compartments, the stops and the situation of the connection elements are seen, but the upper face of the compartments is not included to make the inside visible. A representation of the structural elements of the vehicle is also illustrated as an indication.

As an example, in order to incorporate this preferred embodiment of the invention into a car, a configuration may be considered where four compartments (2) are installed underneath the passenger compartment, two on each side, from the rear of the space allocated for the front wheels to the front of the space allocated for the rear wheels, and being installed among the beams and cross-bars of the vehicle frame (25), and even being able to incorporate other beams and cross-bars in the central part among compartments (2). FIG. 3 illustrates the arrangement of the compartments (2) together with this vehicle frame (25) in this configuration.

The invention claimed is:

1. An energy storage system for vehicles comprising:
   a) a battery containing a plurality of electrical energy storage units inside;
   b) a compartment for the accommodation of the battery in a vehicle comprising a drawer housing the battery therein, wherein
   the battery has an rectangular prism shape, with a lower base and an upper base enclosed by a heat conductive material and with electrical connection and communication connection inserted in the upper base and accessible from outside thereof;
   the compartment for the accommodation of the battery in the vehicle comprises an ensemble fixed to a structure of the vehicle, installed at a bottom of the vehicle, the drawer, connected to said ensemble, said ensemble containing electrical connection and communication connection complementary to those in the upper base of the battery, the opening and the closing of the compartment take place with a movement of the drawer respectively having a downward and an upward component, the drawer allows inserting or extracting the battery with a horizontal movement of the battery when the compartment is open, the connections of the respective electrical connection and communication connection are established with the movement of the drawer having the upward component which causes the compartment to be closed and are kept while the compartment is closed.

2. The energy storage system for vehicles according to claim 1, wherein the battery contains on the inside auxiliary systems among which a power converter is included.

3. The energy storage system for vehicles according to claim 1, wherein the elements inside the battery subject to an electrical voltage are electrically insulated by an electrically insulating, heat conductive material.

4. The energy storage system for vehicles according to claim 1, wherein the battery is enclosed at a front face, a rear face and side faces by a casing made of an electrically and heat insulating material.

5. The energy storage system for vehicles according to claim 4, wherein the battery has at least one handle on the side faces.

6. The energy storage system for vehicles according to claim 4, wherein the battery includes at least one cylindrical-shaped bearing on the lower part of the side faces.

7. The energy storage system for vehicles according to claim 1, wherein the battery has a state indicator comprising one or several LED of one or several colors situated on its upper base or on a side face and visible from the outside.

8. The energy storage system for vehicles according to claim 1, wherein the battery has a state indicator comprising a screen with alphanumeric indicators situated on its upper base or on a side face and visible from the outside.

9. The energy storage system for vehicles according to claim 1, wherein a lower face of the drawer has two levels, an external level and an internal level, where the external level is under the internal level, a small gap existing between both levels.

10. The energy storage system for vehicles according to claim 9, wherein the internal level of the lower face of the drawer consists of supports for the battery in the front face and the rear face.

11. The energy storage system for vehicles according to claim 10, wherein the supports are formed by a structural part, supporting the weight of the battery, and an upper piece having a low friction coating.

12. The energy storage system for vehicles according to claim 9, wherein the drawer has a bump on the internal level of the lower face, in the area of an outer side face.

13. The energy storage system for vehicles according to claim 1, wherein the ensemble fixed to the structure of the vehicle comprises cooling openings in the lower part and the upper part of the front face, a rear face or side faces.

14. The energy storage system for vehicles according to claim 1, wherein the ensemble fixed to the structure of the vehicle comprises stops that constrain the vertical and lateral movement of the battery.

15. The energy storage system for vehicles according to claim 14, wherein the stops are located on the sides of the upper part of the compartment in a complementary position to that of the handles of the battery when the compartment is closed.

16. The energy storage system for vehicles according to claim 1, wherein the drawer comprises at least one slide fixed on a front wall and at least another slide fixed on a rear wall and the ensemble fixed to the vehicle structure comprises a bearing for each slide over which that slide moves.

17. The energy storage system for vehicles according to claim 16, wherein each slide has a curved profile causing a movement having a lateral component at the lowest part of the path of the drawer.

18. The energy storage system for vehicles according to claim 1, wherein the compartment contains elements for the detection of the position of the drawer by an external device.

19. The energy storage system for vehicles according to claim 1, wherein the compartment comprises a double safety system employing a plate attached to the drawer forming a wall on an outer side face of the drawer when the compartment is closed, which is attached to the ensemble fixed to the vehicle and detached from the drawer when the compartment is opened.

20. The energy storage system for vehicles according to claim 1, wherein the inside of the drawer is accessible from an outer side face and an upper face.

21. The energy storage system for vehicles according to claim 1, wherein the inside of the drawer is accessible from an outer side face, an inner side face and an upper face.

* * * * *